Sept. 4, 1934.  J. W. McNAIRY ET AL  1,972,688
CONTROL SYSTEM
Filed Feb. 7, 1933   2 Sheets-Sheet 1
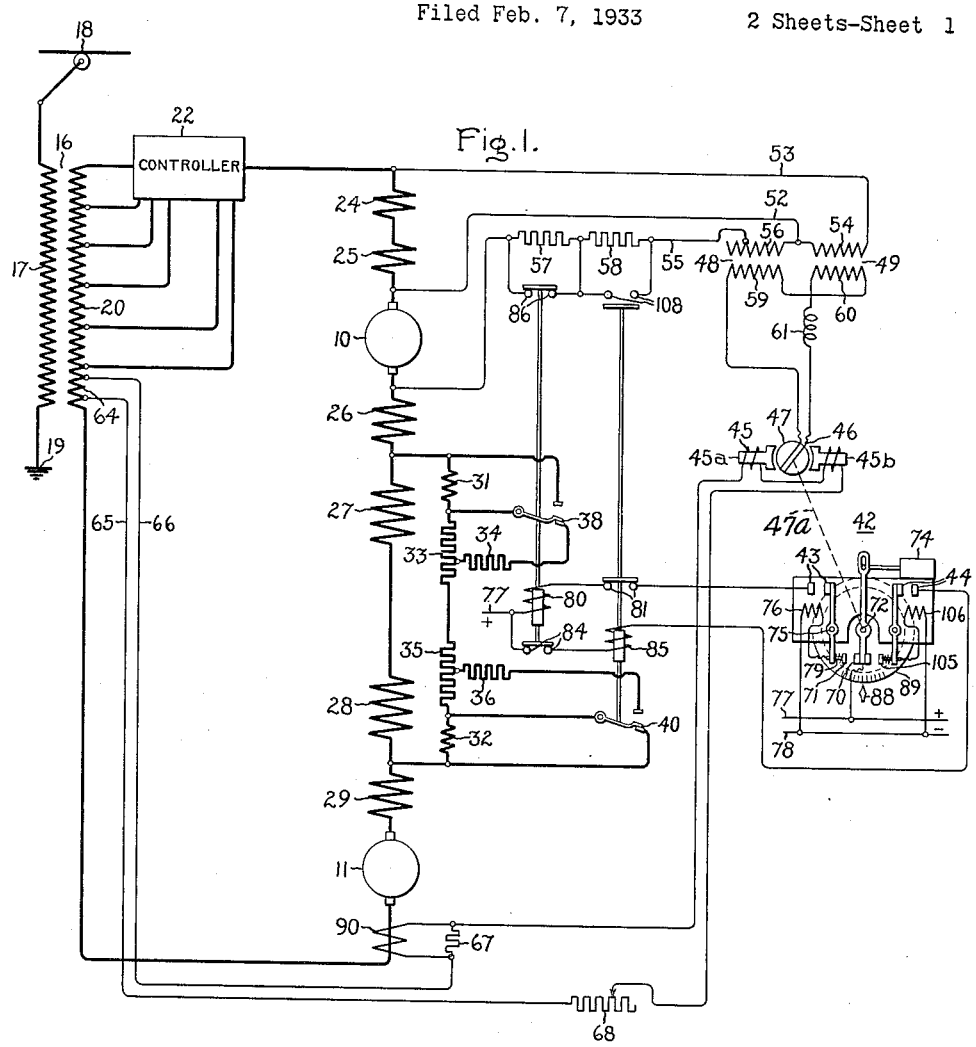
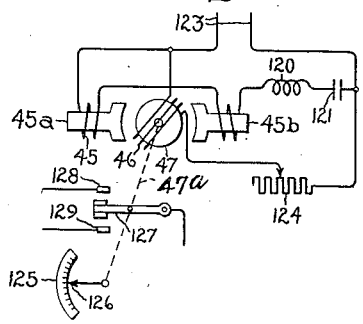
Inventors:
Jacob W. McNairy,
Franklin H. Pritchard,
by Charles E. Tullar
Their Attorney.

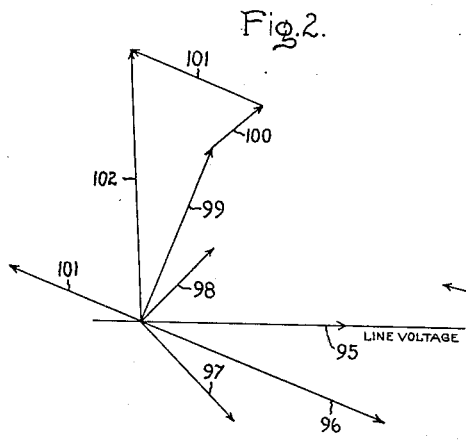
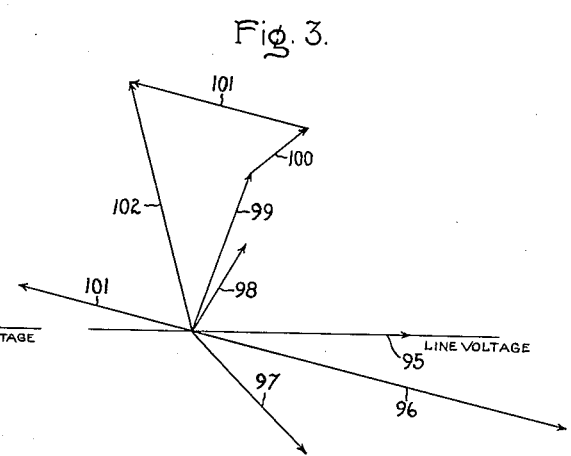
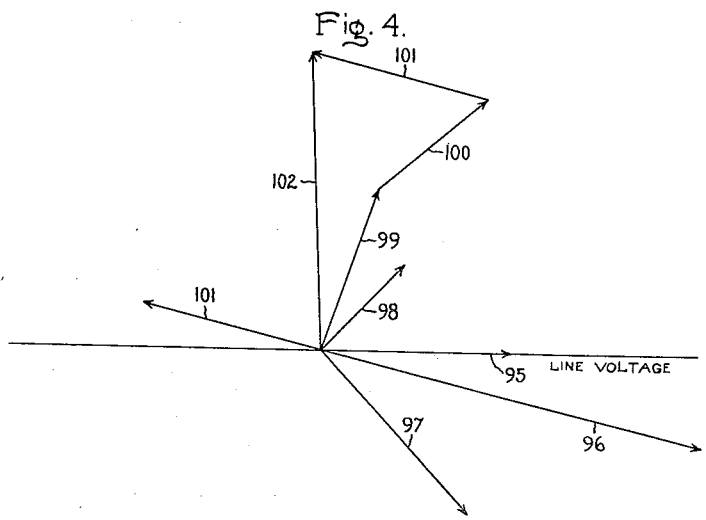

Patented Sept. 4, 1934

1,972,688

UNITED STATES PATENT OFFICE 1,972,688

CONTROL SYSTEM

Jacob W. McNairy and Franklin H. Pritchard, Erie, Pa., assignors to General Electric Company, a corporation of New York Application February 7, 1933, Serial No. 655,598

18 Claims. (Cl. 172—274)

Our invention relates to control systems responsive to changes in electrical conditions of a circuit, more particularly to the provision of a means arranged to be electrically operated in accordance with motor speed, and has for an object the provision of a simple and reliable device of this character.

For satisfactory operation of alternating current motors of the commutator type, it is necessary to control the phase relation and the magnitude of the commutating or inter-pole current in accordance with motor speed. If this is not done correct commutating conditions will not exist as the motors are acceleraed to their full speeds, and arcing will occur at the brushes. To measure the speed of the motor mechanically is costly and introduces many problems in the design of equipment which will withstand the high speeds encountered and at the same time function to control in a positive manner the control circuits. It has been proposed to obtain a rough indication of the speed of the motors by providing a plurality of relays responsive to armature voltage. This method leaves much to be desired in the accuracy of control and furthermore requires a separate relay for each indication desired.

It is, therefore, a further object of our invention to provide a single relay which will control a plurality of circuits as a direct and accurate function of the speed of the motor.

In carrying out our invention in one form thereof, we apply to the stator and rotor elements of the relay two voltages, the phase relation of which varies with the speed of the motor. In this embodiment of our invention we apply the vector difference between the voltage across the exciting field winding of the motor and the voltage across the armature of the motor to the rotor winding of the relay, and apply a voltage from the source of supply to the stator winding of the relay. By arranging the rotor winding of the relay along an axis of the rotor, the rotor will be moved in direct proportion to the speed of the motor. To assist in securing the most effective phase relation between the stator and the rotor currents of the relay, a reactor is preferably included in the rotor circuit. In one form of our invention we utilize this relay to control, by means of suitable switches, the connections of the interpole field windings to give correct commutating conditions for all motor speeds.

Our relay has application where response is desired to changes in various electrical conditions and in a modified form of our invention we have disclosed its application to a frequency responsive system.

For a more complete understanding of our invention reference should now be had to the drawings in which Fig. 1 illustrates diagrammatically our invention applied to a traction drive, while Figs. 2, 3 and 4 illustrate vector diagrams explanatory of our invention. Fig. 5 shows diagrammatically a modified form of our invention for measuring frequency.

Referring now to the drawings, we have shown our invention in one form as applied to a traction drive provided with single phase alternating current motors 10 and 11 of the commutator type. The energization of the motors 10 and 11 is controlled by means of a power transformer 16, the primary winding 17 of which is connected to a trolley 18 and to ground 19. The transformer secondary winding 20 is provided with a plurality of taps which are connected to a controller 22. The exciting field windings 24 and 25 of the respective motors are connected in series with each other on a common side of the armature of the motor 10. A compensating field winding 26 for the motor 10 is connected to the other side of the armature of this motor. In series with it there are connected the interpole windings 27 and 28 of the respective motors and the compensating winding 29 of the motor 11. The other side of the motor 11 is connected directly to the secondary 20 of the transformer 16. By operating the controller 22 to vary the connections of the secondary winding 20, the voltage applied to the motors 10 and 11 may be controlled to increase or to decrease the speed of the motors.

As is well understood in the art, it is necessary to change the phase relation and the magnitude of the current in the interpole windings as the speeds of the motors increase. Accordingly, the reactors 31 and 32 are connected in circuit with the resistors 33, 34, 35 and 36. A pair of switches 38 and 40 are arranged to vary the relation of the reactors with respect to the resistors so that the desired phase relation of current may be maintained in the interpole windings.

The speed relay 42 has a pair of contacts 43 and 44 connected to control respectively the operation of the switches 38 and 40. The operating element of the relay 42 includes a stator winding 45 and a rotor winding 46. As shown in the drawings, the stator winding 45 is divided between two oppositely disposed magnetic pole pieces 45a and 45b which substantially surround the rotor. The rotor winding 46 has its turns grouped along a diameter of the rotor 47, which rotor is preferably constructed of magnetic material and which is mechanically connected to operate the contacts 43 and 44 by means of a shaft indicated diagrammatically by the broken line 47a. Normally the rotor winding 46 is maintained in the low speed position, which position in the form of the invention shown is with the plane of the rotor winding substantially parallel to the axis of the pole pieces 45a and 45b.

It is essential to our invention to so arrange the constants of the stator circuit and the rotor circuit as to produce a 90° relation between the stator current vector and the rotor current vector. When this condition exists it will be understood that there is no net torque produced on the rotor coil 46. However, as the speed of the driving motors 10 and 11 increases, causing a phase shift in the rotor circuit voltage so that the 90° relation between the stator and rotor currents is no longer maintained, a torque is produced on the rotor winding. As the rotor is moved to a new position, however, a voltage is produced due to the changing mutual inductance between the rotor and stator windings in such a direction and of such magnitude as to return the 90° relation between the rotor and stator currents. Thus it will be seen that for a given change in the phase relation between rotor and stator currents, the speed relay is operated an amount proportional to the magnitude of the change. As shown in Fig. 1, the relay 42 accurately measures the motor speed because the stator and rotor currents change from the 90° relation as the motor speed varies.

Referring now to the rotor winding 46, it will be observed that the rotor circuit voltage is obtained by adding vectorially the voltage across the exciting field windings 24 and 25 and the voltage across the armature of the motor 10. These voltages are combined by means of the transformers 48 and 49. The transformers insulate the relay from the motor circuits and may be used for changing the magnitude of the voltages when necessary. In the present case it will be assumed that the transformer 49, connected to the field windings 24 and 25, has a 1:1 ratio between its primary and secondary windings. Accordingly, it will be observed that the conductors 52 and 53 connect the transformer primary winding 54 across the exciting field windings 24 and 25. It will further be assumed that the voltage derived from the armature of motor 10 by the conductors 52 and 55 is to be reduced in magnitude. In an actual installation the armature voltage was reduced to one-fifth the desired voltage and in the present case the transformer will be assumed to have a 5:1 ratio so as to accomplish a corresponding reduction in voltage. The resistances 57 and 58 are included in the circuit of winding 56 to prevent pumping.

The voltages appearing across the secondary windings 59 and 60 of the respective transformers 48 and 49 are combined by connecting the secondary windings in series with each other, an impedance device 61 and the rotor winding 46. Inasmuch as the vector difference between exciting field voltage and armature voltage is to be applied to the rotor circuit, the transformer secondary winding 60 is reversed in polarity with respect to the transformer secondary winding 59. The impedance device or reactor 61 is included in the rotor circuit to provide a 90° phase relation between the stator and rotor currents at a predetermined motor speed and for the position of the rotor winding which will result in the maximum movement of the rotor over a desired range of motor speeds. The reactor 61 furthermore stabilizes the operation of the relay, inasmuch as a greater voltage can be impressed on the circuit including the secondary windings of the transformers 48 and 49 by reason of the inclusion of the reactor 61 in the circuit. The result of increasing the voltage on the rotor circuit is to diminish the effect of the mutual inductance voltage or the voltage induced due to the mutual inductance between the stator and rotor windings. By controlling the effect of the mutual inductance voltage, the extent of the movement of the rotor for a given change in motor speed can be controlled. If the impedance device 61 were not included, the induced or mutual inductance voltage might upset the vector relation between the rotor and stator currents, which relation must be maintained in order for the relay to operate satisfactorily. The impedance device therefore is used to determine the range of operation of the relay and to insure stable operation.

The vector relation between the complete stator circuit voltage and stator current is determined by the reactance and resistance of the stator winding 45 and its circuit. This circuit is derived from a section 64 of the power transformer secondary winding 20 by the conductors 65 and 66 and includes the resistances 67 and 68.

With the above understanding of certain elements in the system and their function, it is believed that the operation of the system itself and the manner in which the relay 42 controls the interpole connections in accordance with motor speed will be readily understood from the description which follows. In the operation of our invention it will be assumed that the rotor 47 of the speed relay is in its mid-position, as shown in Fig. 1, before the trolley 18 has been energized. As soon, however, as the trolley 18 is energized the stator circuit of the relay is energized from the section 64 of the power transformer secondary winding 20. Consequently, with the stator winding 45 alone excited, sufficient current is induced in the closed rotor circuit to give a small torque to return the relay to the low speed connection. This closed circuit includes the secondary windings 59 and 60 of the transformers 48 and 49 and the reactor 61. The primary windings of the transformers 48 and 49 are short circuited through the main motor circuits.

As the rotor 47 is moved in a clockwise direction to this low speed position a contact 70 is moved by the rotor shaft indicated diagrammatically by the broken line 47a into engagement with a contact 71. The contact 70 is pivoted at 72 and its movement in either direction is opposed by a dashpot 74. The dashpot prevents over-travel of the relay which might arise during notching back on the controller and it provides a slight time delay while the motor field connections are being changed. When the field connections are changed a transient results which except for the dashpot might otherwise cause the relay to flutter. In order to secure the positive closing of the contacts 43, a magnetic coil 76 is arranged to be energized by the slightest engagement between the contacts 70 and 71. The circuit through the magnet coil 76 may be traced from the positive source of supply 77, contacts 70 and 71, magnet coil 76, and to the negative source of supply 78. Inasmuch as the contact 71 is pivoted at 75, the coil rotates the contact carrying arm to close positively the contacts 43. A coil spring 79 is arranged about the supporting pin of the contact 71 so that as the contacts 43 are closed by the coil 76 this spring is compressed and applies a bias to improve the electrical connection between the contacts 70 and 71. The closing of the contacts 43 energizes the operating coil 80 of the switch 38 through a circuit which may be traced from the positive source of supply 77, operating coil 80, interlock contacts 81 provided on the switch 40, contacts 43, and magnet coil 76 to the negative source of supply 78. The switch 38 is thereupon operated to short circuit the reactor 31 and to open the interlock contacts 84 which are connected in circuit with the operating coil 85 of the switch 40. At the same time the inter-lock contacts 86 operated with the switch 38 are opened to insert the resistance 57 in the circuit from the armature of motor 10.

As described, the relay may be used to measure the speed of the motors 10 and 11 by providing in conjunction with a fixed pointer 88 a disk 89 calibrated in miles per hour and secured to the relay shaft. However, as applied to the control of the interpole shunt connections, it is desirable to modify slightly the operation of the relay in accordance with the load current taken by the motors 10 and 11. Accordingly, a current transformer 90 is connected across the resistance 67 so that a voltage is introduced into the stator circuit, which voltage varies in magnitude in accordance with the magnitude of the load current.

It will now be assumed that the controller 22 has been operated to vary the tap connections of the secondary coil 20 of the power transformer 16 so as to increase the voltage applied to the circuit including the motors 10 and 11. As the speeds of the motors increase, the rotor 47 of the speed relay 42 is moved in a counter clockwise direction an amount proportional to the change in motor speed. The manner in which the phase angle between the stator and rotor currents is shifted in accordance with speed to produce a resultant torque on the relay will be clearly understood by referring to the vector diagrams of Figs. 2, 3 and 4. Fig. 2 illustrates the relative vectorial positions of current and voltage for a given low speed of the motors. The line voltage is taken as a reference. Neglecting for the present the effect of the current transformer 90, it will be remembered that the voltage applied to the stator coil circuit is derived by the conductors 65 and 66 from the power transformer secondary winding 20. Consequently, the stator circuit voltage 95 is shown in phase with the line voltage. The armature voltage 96 is shown lagging the line voltage by a substantial angle which corresponds to the assumed conditions when the motors are rotating at a relatively low speed. The relation between the stator circuit voltage 95 and the stator current 97 is determined by the reactance and resistance of the stator winding 45 and its circuit. As we have stated above, the stator winding possesses high reactance; consequently the stator current 97 is shown lagging the stator voltage by a substantial angle.

For a stable position of the rotor 47, the rotor current 98 leads the stator current 97 by 90°. When the rotor current occupies a 90° relation with respect to the stator current no net torque is exerted upon the rotor winding 46. Consequently it is held in position with the contacts 70 and 71 closed. The exciting field voltage 99 leads the line voltage by the angle indicated. By adding vectorially the voltage derived from the exciting field winding, the voltage derived from the armature and the voltage due to the mutual inductance between the stator winding 45 and the rotor winding 46, the rotor circuit voltage which is applied to the reactor 61 and the rotor winding 46 is obtained. The voltage induced in the rotor winding 46 by the stator winding 45 is represented by the vector 100. For simplicity it will be assumed that the resistance and leakage reactance of the rotor is negligible so that the induced voltage 100 is substantially 90° ahead of the stator current. The armature voltage diminished in magnitude and reversed in direction by the transformer 48 is shown by the vector 101. The vectorial sum 102 of the vectors 99, 100 and 101 represents the rotor circuit voltage. The angle between the rotor circuit voltage 102 and the rotor current 98 is fixed by the constants of the rotor coil circuit.

It will now be assumed that the relay rotor 47 is held mechanically in a stationary position while the controller 22 is operated to increase the speeds of the motors. As the motor speed increases the armature voltage 96 decreases its angle of lag with respect to the line voltage and increases in magnitude. The effect of the change in angle and magnitude of the vector 101 representing the armature voltage divided by five and reversed in direction causes the rotor circuit voltage 102 to increase its angle of lead with respect to the line voltage. The exciting field voltage 99 also increases its angle of lead with respect to the line voltage due to the increase in motor speed. The new positions of the vectors are shown in Fig. 3. Inasmuch as the angle between the rotor circuit voltage and the rotor current is fixed by the constants of the circuit, it will be seen that the rotor current 98 no longer remains at the 90° relation with respect to the stator current but takes a position of more than 90° out of phase with the stator current. The result is the production of a net torque on the rotor winding 46 which tends to move the rotor in a counter-clockwise direction.

Assuming now that the rotor 47 has been released it will be apparent that the net torque resulting from the shift in currents will cause the rotor to move to a position determined by the magnitude of the phase difference between the stator and rotor currents. As the rotor winding 46 is moved in the clockwise direction the relative position of the stator and rotor windings changes and results in a greater mutual inductance between the windings and causes the return of the rotor circuit voltage to a position where the rotor current again occupies a 90° relation with respect to the stator current. This condition is shown in Fig. 4, and the increased magnitude of the mutual inductance voltage 100 over the corresponding voltage of Fig. 3 will be apparent by comparing Figs. 3 and 4. It will, therefore, be seen that the rotor 47 of the speed relay is always operated to and maintained in a given position, which position depends upon the speed at which the driving motors 10 and 11 are operating.

In describing our invention thus far, the function of the mutual inductance voltage 100 induced by the flux resulting from the stator current has been emphasized in returning the rotor current to the 90° relation with respect to the stator current.

It is to be expressly understood, however, that a voltage can be produced in the stator winding by a change in the stator flux resulting from the rotor current to accomplish this same result. If it is desired to rely upon the voltage induced by the rotor current in the stator winding this can be accomplished by suitably proportioning the impedance device 61 connected in the rotor circuit and selecting a suitable angular relation between the rotor and the stator windings. In the relay we have described the voltage induced in the stator winding by the rotor current has a slight effect upon the operation of the relay but for the design described, however, this effect may be neglected.

It will now be assumed that the motors have been accelerated to a speed which operates the relay to its mid-position. In this position, as shown in Fig. 1, the contacts 70 and 71 are open and the switch 38 is operated to include the reactor 31 in the interpole shunt connections and to exclude the resistor 34 and a portion of the resistor 33. The interlock contacts 86 at the same time are operated to short circuit the resistance 57.

As the motor speed is further increased the relay continues its counter-clockwise movement until the contact 70 is operated into engagement with a contact 105. An energizing circuit is thereby established for a magnet coil 106, which coil closes the contacts 44. The arrangement is identical in function with the low speed contacts 43. The closing of the contacts 44 energizes the operating coil 85 of the switch 40 through a circuit which may be traced from the positive source of supply 77, interlock contacts 84, operating coil 85, contacts 44, magnet coil 106 and to the negative source of supply 78. The switch 40 is thereupon operated to include the reactor 32 in the interpole shunt connections and to exclude the resistor 36 and a portion of the resistor 35. At the same time the contacts 108 operated with the switch 40 are closed to short circuit the resistance 58.

As we have stated, the resistances 57 and 58 are connected in series with the transformer primary windings 56. Their functions are to control the magnitude of the voltage derived from the armature of the motor, to aid in fixing the power factor relation of the relay and to prevent pumping or repeated operation of the relay. This repeated operation or pumping might occur due to the change in power factor incident to the control of the interpole shunt connections so that after a change in the interpole connections the resulting change in power factor would cause the relay to reestablish the original connections. We have found that the resistances controlled in the manner described overcome the difficulties mentioned.

Now that the principles of operation of the relay 42 have been fully explained, it will be understood that the operation of the relay may be modified as desired, for example, we have shown the current transformer 90 connected across the resistance 67. The current transformer serves to introduce a variation in the operation of the relay in accordance with the load current taken by the driving motors. For example, the voltage applied across the resistance 67 causes the stator voltage to lag behind the line voltage an amount depending upon the magnitude of the motor current. This voltage is in phase with the motor current and causes the relay to operate at a lower motor speed in accordance with the load current as well as in accordance with motor speed.

Referring now to Fig. 5, we have shown a modified form of our invention wherein the rotor winding 46 and the stator winding 45 are arranged as described in connection with Fig. 1. In this case, however, a reactance 120 and capacitance 121 are connected in series with the stator winding 45. The stator coil circuit is connected across a variable frequency source of supply 123 and the rotor winding 46 is connected through a resistance 124 across the same source of supply. The values of the reactance and capacitance in the stator circuit are selected so that for a given frequency the stator current occupies a 90° relation with respect to the rotor current. Consequently, as we have explained in connection with Fig. 1, no net torque is produced between the rotor and stator windings so that the rotor is maintained in a given position. Now assuming that the frequency of the source of supply varies, it will be understood that the reactance 120 and the capacitance 121 cause the rotor current to be displaced from the 90° relation with respect to the rotor current. The result is the production of a net torque on the rotor winding which causes the rotor to assume a new position. The voltage induced between the windings due to the changing mutual inductance again serves its function in returning the stator and rotor currents to the 90° relation. Thus it will be seen that the frequency of the alternating current source of supply can be accurately measured by providing a suitably calibrated scale 125 across which a pointer 126 is moved by the rotor. By arranging a movable contact member 127 on the rotor shaft control circuits may be completed through stationary contacts 128 and 129. These control circuits may be used as desired; for example, they may be used to control the driving element of an alternating current generator so as to maintain the generation of power at a predetermined frequency.

What we claim as new and desire to secure by Letters Patent of the United States is:

1. An electroresponsive means comprising a stator winding, a rotor winding inductively associated with said stator winding, means for energizing said windings to produce a 90° phase relation between the currents in said windings, and means for varying the energization of one of said windings to vary said phase relation and thereby to produce a torque to move said rotor winding to a new position, the mutual inductive relation of said windings being such that the change in mutual inductance resulting from the movement of said rotor winding to said new position reestablishes said 90° phase relation.

2. Electroresponsive means comprising a pair of inductively related windings, one of said windings being movably mounted, the mutual inductance relation of said windings being such that when dephased voltages are applied to said windings said movable windings seek a position of stability with respect to the other in which the currents in said windings bear a 90° phase relation with respect to each other, and means for varying the phase relation of said currents to cause said movable winding to move to a new position and thereby reestablish said 90° phase relation.

3. A relay for measuring a variable condition of an electrical circuit comprising a stator winding, a rotor winding inductively associated with said stator winding, means for applying dephased voltages to said windings, and means for varying the phase relation of said voltages to produce a torque to move said rotor winding to a new position, the mutual inductance relation of said windings being such that the movement of said rotor winding to said new position establishes a 90° phase relation between the currents in said windings.

4. Means for measuring a variable condition of an electrical circuit comprising a stator winding operatively associated with an iron core provided with an air gap, a rotor winding arranged for rotation within said air gap, the turns of said windings being grouped together so that relative movement between said windings varies the mutual inductance between them, a source of supply, means for energizing said stator winding from said source of supply, an impedance means connected in circuit with said rotor coil for initially establishing a 90° phase relation between the rotor and stator currents, means for applying a voltage to said rotor coil which voltage varies in phase relation in accordance with said variable condition so that the change in phase relation of said voltage causes a net torque to rotate said stator winding to a new position, the change in mutual inductance resulting from the movement of said rotor winding causing the return of said 90° phase relation between rotor and stator currents.

5. An indicating device for measuring a variable condition of an electrical circuit comprising a stator winding wound on an iron core having an air gap, a rotor winding mounted for rotation within said air gap and having its turns so related with respect to each other that a small movement of said rotor winding causes a relatively large change in the mutual inductance between said windings, means for magnetically maintaining said rotor winding in a predetermined position comprising means for energizing said windings so that initially a 90° phase relation between the currents of said windings is produced, means responsive to said condition to be measured for varying said phase relation so as to produce a net torque to rotate said rotor winding, the change in mutual inductance resulting from the movement of said rotor winding causing the return of said 90° phase relation between said stator and rotor currents so as to hold magnetically said rotor winding in its new position.

6. In combination, a single phase alternating current motor of the commutator type provided with an exciting field winding and an armature winding, a source of alternating current supply for said motor, means for indicating the speed of said motor comprising a stator winding arranged about a pair of oppositely related pole pieces, a rotor winding mounted for rotation between said pole pieces, connections for applying to said stator winding circuit a voltage from said source of supply, and means for applying to said rotor winding circuit the vector difference between the voltage across the exciting field winding and the armature of said motor.

7. In combination, a single phase alternating current motor of the commutator type provided with an exciting field winding and an armature winding, a source of alternating current supply for said motor, means for indicating the speed of said motor comprising a stator winding arranged about a pair of oppositely related pole pieces, a rotor winding mounted for rotation between said pole pieces, connections for applying to said stator winding circuit a voltage from said source of supply, and means for applying to said rotor winding circuit the vector difference between the voltage across said exciting field winding and a predetermined fraction of the voltage across the armature winding whereby it is moved from one position to another in response to speed changes of said motor.

8. Means for indicating the speed of an alternating current dynamo-electric machine comprising a relay having stator and rotor windings, means for applying a voltage of fixed magnitude and power factor to the stator circuit, means for applying to the rotor winding circuit the vector difference between the voltage across the exciting field winding and the armature of said dynamo-electric machine whereby the magnetic flux produced by the rotor and stator currents causes the rotor winding to be moved from one position to another in proportion to the speed of said dynamo-electric machine.

9. In combination, a single phase alternating current motor of the commutator type provided with an exciting field winding and an armature winding, means for indicating the speed of said motor comprising a stator winding arranged about a pair of pole pieces, a rotor winding mounted between said pole pieces, connections for applying to said stator circuit winding a voltage from said source of supply, means for applying to said rotor winding the vector difference between the voltage across the exciting field winding and the armature of said motor and an impedance device connected in said rotor circuit for controlling the phase relation between the voltage and the current of said rotor winding so that initially a 90° phase relation is maintained between the stator and the rotor currents, the speed changes of said motor varying said phase relation so as to rotate said rotor winding in proportion to the degree of the speed changes.

10. In combination, a single phase alternating current motor of the commutator type provided with an exciting field winding and an armature winding, a source of alternating current supply for said motor, means for indicating the speed of said motor comprising a stator winding arranged about a pair of oppositely related pole pieces, a rotor winding mounted for rotation between said pole pieces, connections for applying to said stator winding circuit a voltage from said source of supply, and means for applying to said rotor winding circuit the vector difference between the voltage across said exciting field winding and a predetermined fraction of the voltage across the armature winding comprising a transformer having its primary winding connected across said exciting field winding, a second transformer having its primary winding connected across the armature of said motor, connections for connecting the secondary winding of said first transformer in series with the secondary winding of said second transformer and in series with said rotor winding, said transformer secondary windings being reversed in polarity with respect to each other, the ratio of said second transformer being selected to produce substantially the maximum shift in phase relation of the voltage applied to said rotor winding circuit for a given change in speed of said motor.

11. In combination, a single phase, alternating current motor of the commutator type provided with an exciting field winding and an armature winding, a source of supply for said motor, means for indicating the speed of said motor comprising a stator winding arranged about a pair of pole pieces, a rotor winding mounted for movement between said pole pieces, connections for applying to said stator winding circuit the voltage from said source of supply, transformer means for applying to said rotor winding circuit the vector difference between the voltages across said exciting field winding and the armature of said motor, said transformer means being arranged to magnify said vector difference by varying the relative magnitudes of said voltages so that a maximum phase displacement occurs for a given change in speed of said motor and an impedance device connected in said rotor winding circuit for controlling the phase relation between the voltage and current of said rotor winding so that initially a 90° relation exists between said stator and rotor currents.

12. In combination, an alternating current electric machine of the commutator type provided with an armature winding and an exciting field winding, means for measuring the speed of said machine comprising a stator winding wound about a magnetic core having an air gap, a rotor winding mounted for movement within said air gap, transformer means for applying to said rotor winding circuit voltages derived from said armature winding and said exciting field winding, the said transformer means being arranged to vary the magnitude of said derived voltages to produce a maximum phase displacement of the voltage in accordance with speed changes of said motor, means for energizing said stator winding, the constants of said rotor winding circuit and said stator winding circuit being selected so that with said rotor winding in its initial position a 90° phase relation exists between said stator and rotor currents, said phase displacement of said derived voltages causing said phase relation to be varied so that a net torque is produced on said rotor winding to move it to a new position whereby the change in mutual inductance between said stator and rotor windings causes the production of a voltage which returns said currents to said 90° phase relation after said rotor winding has moved to its new position as determined by the magnitude in change of motor speed.

13. In combination, a single phase variable speed commutator motor having an exciting field winding, an armature winding and an interpole field winding, shunt connections for said interpole field winding, control means for varying said shunt connections in predetermined sequence, means for controlling said control means comprising a stator winding associated with magnetic pole pieces provided with an air gap, a rotor winding mounted for movement within said air gap, the turns of said rotor winding being grouped together so as to provide a large change in mutual inductance between said windings for a predetermined movement of said rotor winding, transformer means for applying to said rotor winding circuit voltages derived from said exciting field winding and said armature winding, means for energizing said stator winding, an impedance device connected in said rotor winding circuit for establishing a 90° relation between said stator and rotor currents for the initial position of said rotor, changes in the motor speed causing said rotor winding to be moved from one position to another, the change in mutual inductance resulting from said movement producing a voltage which reestablishes said 90° relation after said stator winding has moved an amount proportional to the change in motor speed.

14. A speed relay comprising a stator winding wound upon an iron core provided with an air gap, a rotor, means for mounting said rotor for rotation within said air gap, a winding supported by said rotor the turns of which winding are grouped together so as to produce substantial changes in the mutual inductance between said windings when said rotor is moved from one position to another, a transformer having primary and secondary windings, connections for connecting said secondary winding in closed series circuit relation with said rotor winding, an impedance device connected in said rotor circuit and means for energizing said stator winding, the resultant current flow through said stator winding and the induced current flow through said rotor circuit causing said rotor to move to an initial position determined by the value of said impedance so that in said initial position a 90° phase relationship exists between the currents in said rotor winding and said stator winding.

15. In combination, a single phase commutator motor having an exciting field winding, an armature winding and an interpole field winding, a power transformer for controlling the energization of said motor and its field windings, a reactor and a resistance for controlling the phase relation of the current flowing through said interpole field winding, a contactor operable to one position to short circuit said reactor and to a second position for short circuiting said resistance, means for controlling the operation of said contactor in accordance with the speed of said motor comprising a relay having a stator winding wound about an iron core provided with an air gap, a rotor winding mounted for rotation within said air gap, transformer means for applying to said rotor winding circuit the vector difference between voltages derived from said exciting field winding and said motor armature, connections for energizing said stator winding from said power transformer secondary winding, relay contacts arranged to be operated by movement of said rotor winding for controlling the operation of said contactor, an impedance device connected in said rotor circuit for producing a 90° phase relationship between said rotor and said stator currents when said rotor winding occupies a predetermined position the vector relation between said voltages derived from said exciting field winding and said armature changing as the speed of said motor is increased so as to produce a torque on said rotor winding whereby said contactor controls said interpole shunt connections in accordance with speed changes of said motor.

16. In combination, a single phase, alternating current motor of the commutator type provided with an exciting field winding, an armature winding and an interpole field winding, a source of alternating current supply for said motor, shunt connections for said interpole field winding arranged to control the magnitude and phase relation of the interpole field winding current in accordance with motor speed, means responsive to the motor speed for completing said connections in predetermined sequence comprising a stator winding wound about a magnetic core having an air gap, a rotor winding mounted for movement within said air gap the turns of said rotor winding being grouped together so as to produce a relatively large change in mutual inductance as said rotor winding is moved from one position to another, transformer means for applying to said rotor winding circuit voltages derived from said motor armature winding and said exciting field winding, the said transformer means being arranged to vary the relative magnitude of said derived voltages to produce a maximum phase displacement of the voltage as the speed of the motor changes, means for energizing said stator winding from said source of supply, the constants of said rotor winding circuit and said stator winding circuit being selected so that with said rotor winding in its initial position and said motor rotating at a predetermined speed a 90° phase relation exists between said stator and rotor currents, the phase displacement of said derived voltages causing said phase relation to be varied whereby a net torque is produced to move progressively said motor winding from its initial position as said motor speed increases, whereby the change in mutual inductance between said stator and rotor windings causes the production of a voltage which returns said currents to said 90° phase relation after said motor reaches a new speed and said rotor winding has moved to a new position, and means operable by the movement of said rotor winding from one position to another for completing said interpole connections.

17. In combination, a single phase commutator motor having an exciting field winding, an armature winding and an interpole field winding, a plurality of shunt connections for controlling the phase relation and magnitude of the current flowing through said interpole field winding, a power transformer for energizing said motor and its field windings, a speed responsive relay for completing said interpole shunt connections in predetermined sequence comprising a movable contact associated with a pair of fixed contacts arranged to control said interpole shunt connections, a rotor for moving said movable contact from one to the other of said fixed contacts, a winding for said rotor having its turns grouped together, a stator winding wound about a magnetic core having an air gap, means for mounting said rotor and said rotor winding for movement within said air gap the grouped turns of said rotor winding causing a substantially large change in the mutual inductance between said windings, a pair of transformers the secondary windings of which are connected in closed circuit relation with said rotor winding, connections for energizing said stator winding from said power transformer secondary winding so that initially the current flowing through said stator circuit biases said rotor to an initial position, connections for connecting the primary winding of one of said pair of transformers in said motor circuit and the primary of the other of said pair of transformers in said exciting field winding, the polarity of said transformers being reversed with respect to each other so as to apply to said rotor circuit the vector difference between the voltages derived from said exciting field winding and said armature, an impedance device connected in said rotor circuit for producing a 90° phase relation between said rotor current and said stator current when said rotor occupies said initial position whereby said rotor operates said movable contact member from said initial position to new positions as the speed of said motor increases.

18. In combination a stator winding wound about a magnetic core provided with an air gap, a rotor winding mounted for rotation within said air gap the turns of said winding being grouped together, impedance means connected in circuit with one of said windings for producing a 90° phase relation between the rotor and stator currents for a predetermined frequency, and connections for connecting said windings to a variable frequency whereby variations in said frequency from said predetermined frequency cause a net torque to be produced on said rotor winding to move it from one position to another, the change in mutual inductance between said stator and rotor windings causing the return of the stator and rotor currents to said 90° phase relation whereby said rotor is moved an amount determined by the change in frequency.

JACOB W. McNAIRY.
FRANKLIN H. PRITCHARD.